United States Patent [19]

Dahlgren

[11] Patent Number: 5,302,107

[45] Date of Patent: Apr. 12, 1994

[54] APPARATUS FOR FORMING SHAPED PARTS OF THERMOSETTING RESINS OR OTHER MATERIALS

[75] Inventor: William R. Dahlgren, Palos Verdes Estates, Calif.

[73] Assignee: Airtech International Inc., Carson, Calif.

[21] Appl. No.: 894,951

[22] Filed: Jun. 8, 1992

[51] Int. Cl.⁵ .............................. B29C 43/12
[52] U.S. Cl. .................... 425/388; 425/405.1; 138/116; 138/125; 138/137; 285/7; 156/285
[58] Field of Search ........... 425/85, 89, 388, DIG. 60, 425/405.1; 328/252; 138/116, 125, 137; 264/511; 156/285, 286, 287; 285/7, 332, 149

[56] References Cited

U.S. PATENT DOCUMENTS

| | | | |
|---|---|---|---|
| 3,062,241 | 11/1962 | Brumbach | 138/125 |
| 4,478,661 | 10/1984 | Lewis | 138/125 |
| 4,681,783 | 7/1987 | Hyodo et al. | 138/125 |
| 4,683,099 | 7/1987 | Buxton et al. | 264/511 |
| 4,684,556 | 8/1987 | Ohtsuga et al. | 138/125 |
| 4,715,805 | 12/1987 | Nasu | 425/DIG. 60 |
| 4,732,415 | 3/1988 | Matin et al. | 425/388 |
| 4,942,013 | 7/1990 | Palmer et al. | 264/511 |
| 5,052,906 | 10/1991 | Seemann | 425/405.1 |
| 5,106,568 | 4/1992 | Honka | 425/388 |

FOREIGN PATENT DOCUMENTS

| | | | |
|---|---|---|---|
| 638400 | 3/1962 | Canada | 138/125 |
| 2254041 | 9/1992 | United Kingdom | 425/388 |

*Primary Examiner*—Khanh Nguyen
*Attorney, Agent, or Firm*—John H. Crowe

[57] ABSTRACT

An elongate flexible vacuum tube including an inner porous liner of intertwined flexible fibers of nylon or the like connectable between a vacuum source and the interior of a flexible vacuum bag covering a part formed of uncured thermosetting resin, or of superposed sections or laminae with thermosetting adhesive therebetween, under an overlying porous breather pad of intertwined fibers. An end of the liner can be positioned in intimate contact with the breather pad to form a vacuum path therewith so that a vacuum can be pulled on the part from a vacuum source, through the porous liner and breather pad, while it is being cured in an autoclave.

12 Claims, 1 Drawing Sheet

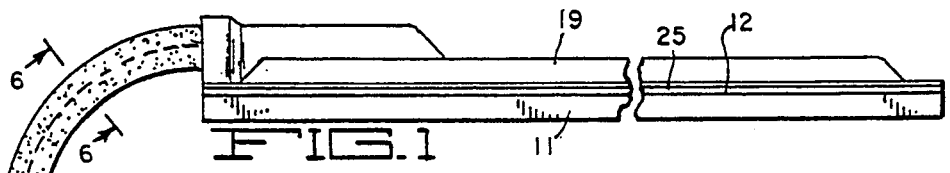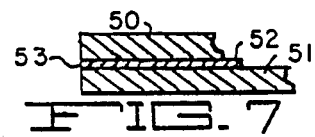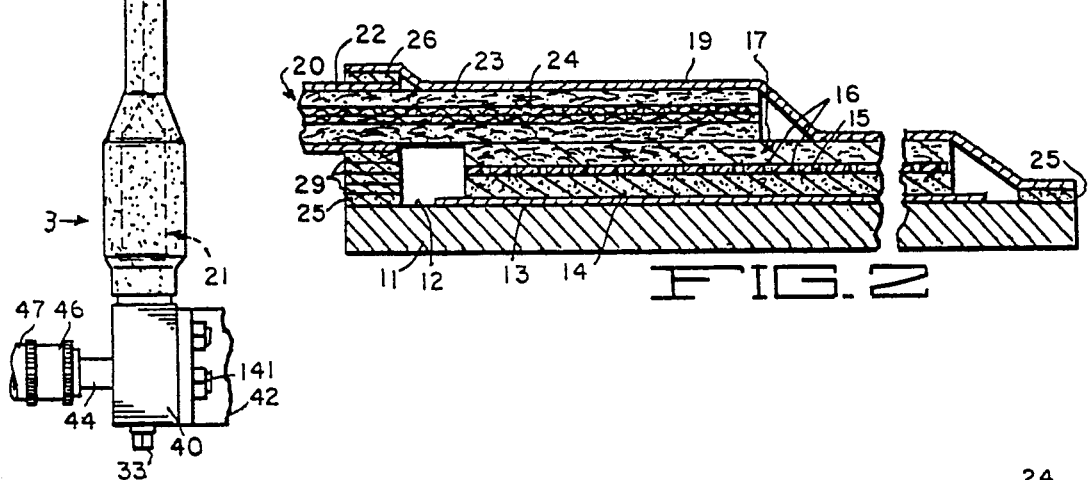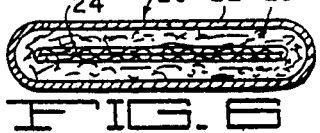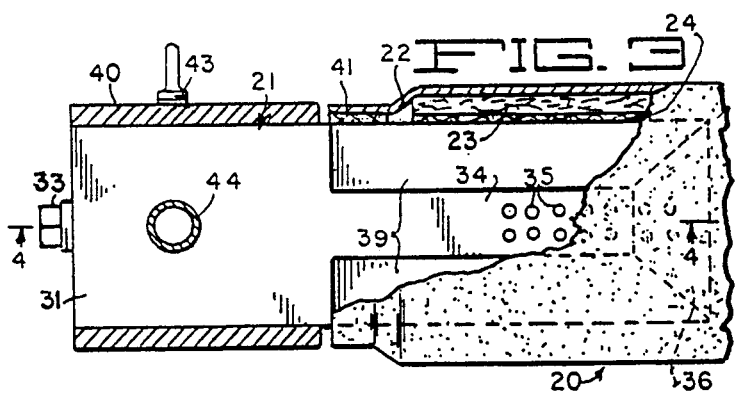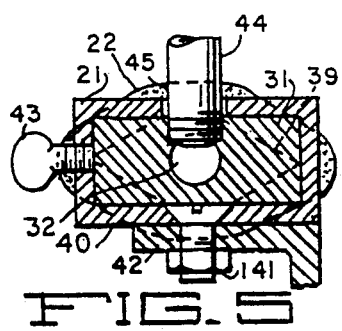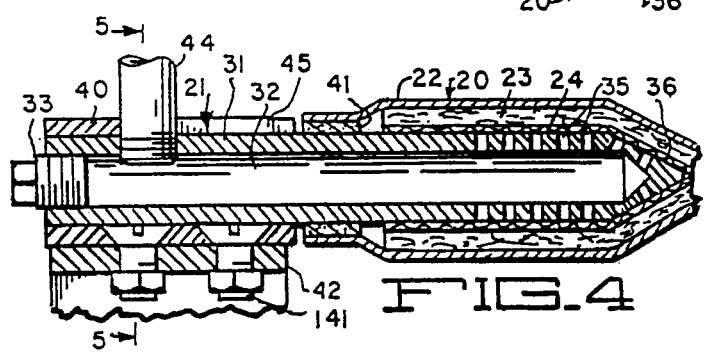

APPARATUS FOR FORMING SHAPED PARTS OF THERMOSETTING RESINS OR OTHER MATERIALS

BACKGROUND OF THE INVENTION

1. Field of the Invention

This invention relates to the manufacture of parts, such as, for example, aircraft, boat and automobile panels, embodying resins and/or adhesive materials.

2. Description of the Prior Art

The curing and/or bonding of shaped composite parts comprising fibers such as graphite or Kevlar fibers impregnated with thermosetting resins or of thin metallic sections or laminas or metallic and resinous sections with thermosetting adhesive therebetween, is recognized as an effective method of manufacturing lightweight, high strength panels.

In curing composite parts, the materials are generally placed on a shaped tool or mold in an uncured and somewhat pliant state. A relatively high degree of temperature and pressure is then applied thereto to remove air, moisture and volatiles from the material during the forming and curing operation.

In bonding thin sections of metal and a composite material together, a thermosetting adhesive is applied between the sections and they are likewise placed on a shaped tool and subjected to a high degree of temperature and pressure to remove the volatile, etc., therefrom during the forming and curing operation.

The bonding of shaped parts is generally accomplished by covering the materials to be bonded with a porous breather mat or pad, mounting a vacuum bag thereover and sealing the edges of the bag to the tool. The assembly is then placed in an autoclave and heated and pressurized therein while vacuum is applied to the vacuum bag to withdraw the air, volatiles, etc. from the part being treated.

The breather pad is preferably formed of intertwined flexible fibers to permit the application of a uniform pressure on the part to force it against the tool in order for it to accurately conform to the contour of the tool and insure the uniform evacuation of gaseous components therefrom. Such breather pads can, for example, be formed of nylon material in the manner disclosed and claimed in my copending patent application, Ser. No. 07/894,949, filed Jun. 8, 1992 now U.S. Pat. No. 5,261,993.

Heretofore, vacuum has generally been applied to the interior of the aforesaid vacuum bag by a suitable vacuum pump or the like connected through a hose to a vacuum valve or connector attached to the bag and communicating through an opening in the bag with its interior. Although these valves are generally satisfactory, any resinous material sucked through such a valve, quick disconnect, and hose to the pump tends to concentrate around the entrance to the valve and quick disconnect and to build up therein, as well as on the inside of the remainder of the vacuum system, thus reducing the amount of vacuum and eventually closing off the passages in the valve, connector, hose, etc., requiring replacement of these parts. It can even clog the vacuum pump in some cases to disable the whole system.

Also, as pressure is applied to the vacuum bag, the vacuum valve is pressed down against the breather pad, which results in a very small and undesirable evacuation path. Moreover, if there is insufficient room on the tool the valve is sometimes placed on top of the part which causes an undesired imprint thereof to be transferred to the surface of the part through the breather pad.

Accordingly, a principle object of the present invention is to provide means for overcoming the above-noted problems.

Another object of the invention is to provide vacuum-conveying means for evacuating a vacuum bag of the above type without any build-up of resins, etc., therein to reduce the amount of vacuum applied to the bag or even disable the system.

Still another object of the invention is to provide an evacuating path which will prevent resins, etc., from being transferred from the part being cured to the vacuum system.

A further object of the invention is to provide vacuum-conveying means which can be repetitively used for a large number of successive curing operations.

Yet another object of the invention is to provide vacuum-conveying means which is inexpensive and readily replaceable.

According to the invention, vacuum-conveying means is provided comprising a flexible tube of any desired length having an inner tubular liner of porous fibrous material which is mounted at one end of the tube for direct contact with said porous breather pad. A vacuum connector is mounted in contact with the liner at the opposite end of the tube and is connected to a suitable vacuum source. As vacuum is applied, the various gases, along with any resins, removed from a part being cured are passed through the breather pad and liner, enabling such resins to be deposited throughout the length of the liner. The liner preferably has a relatively large cross sectional area and can thus accumulate a considerable amount of resin, or other effluent, along its length without adverse effect on the evacuation process.

The vacuum connector is removably supported by a frame part to prevent strain from being applied to the vacuum tube which might otherwise distort the vacuum bag or pull the tube from its connection to the vacuum bag. It also permits quick and ready removal thereof from the connected vacuum bag after each curing operation.

BRIEF DESCRIPTION OF THE DRAWING

The manner in which the above and other objects of the invention are achieved will be readily understood from the following specification considered in conjunction with the accompanying drawing, wherein:

FIG. 1 is a side view of apparatus for use in the forming and curing of a thermosetting resinous part, embodying a preferred form of the present invention.

FIG. 2 is an enlarged, interrupted sectional view showing a portion of an uncured resinous part mounted on a forming tool under a flexible breathing pad with which a vacuum bag and a vacuum tube in accordance with the present invention are associated for a curing operation.

FIG. 3 is a side view of an illustrated vacuum connector taken in the direction of the arrow 3 in FIG. 1, with associated parts being shown partly in section.

FIG. 4 is a longitudinal sectional view of the vacuum connector, taken along line 4—4 of FIG. 3.

FIG. 5 is a transverse sectional view thereof taken along line 5—5 of FIG. 4.

FIG. 6 is a transverse sectional view through a vacuum tube forming part of the illustrated apparatus taken along line 6—6 of FIG. 1.

FIG. 7 is an enlarged fragmentary cross sectional view of a part to be bonded as taught herein comprising superposed metal sections, or laminae, with a layer of thermosetting adhesive material therebetween.

DESCRIPTION OF THE PREFERRED EMBODIMENT

Referring particularly to FIG. 1 and 2, a rigid forming tool 11 is shown which may be made of metal, fiberglass or other suitable material capable of withstanding relatively high temperature changes and having an upper surface 12 contoured in accordance with the desired shape of a part or element to be formed thereon.

A thin film of a release agent 13 of a nonadhering material, normally of a quick drying or paste form such as Teflon, a trademark for polytetrafluorethylene, is applied over the tool surface 12. An uncured part or element 14 containing some resinous material and/or adhesive is placed over the film 13 and fitted to the contour of the tool surface 12.

A release film 15, of any well-known type and having a plurality of small perforations 16 throughout, is laid over the part 14.

A flexible breather pad 17 is then placed over the release film 15. The breather pad is preferably formed of intertwined resilient fibers resulting in a porous resilient body which will retain its porosity and resilience under high temperature and pressure conditions. Such fibers can be nylon fibers or mixtures of nylon and other fibers, as disclosed and claimed in my previously mentioned copending patent application.

A thin flexible air-impervious vacuum bag 19, preferably of nylon, is fitted over the breather pad 17 and its outer edges are hermetically sealed to the tool 11 by a suitable heat resistant adhesive sealing tape 25.

According to the present invention, a flattened flexible vacuum breather tube, generally indicated at 20, is provided to establish an evacuation path between breather pad 17 and a vacuum valve generally indicated at 21. The breather tube 20 comprises a thin outer flexible tubular sheath 22 of air-impervious material, preferably nylon, within which is encased a flattened tubular sleeve or liner 23 of a flexible porous material, preferably intertwined nylon fibers. Typically, the wall of the sheath 22 is in the order of 0.003 inch thick and the wall of the liner 23 is at least 0.175 inch thick.

An inner tubular sleeve 24, preferably of fiberglass cloth, is located within the liner 23 and lines the inside surface thereof. The inner sides of the inner sleeve 24 normally lie in contact with each other as seen in FIG. 6.

As seen in FIG. 2, the sheath 22 is inserted a short distance under the vacuum bag 19 and adhesive sealing tape 26, similar to tape 25, is placed between the sheath and the inner surface of the bag 19. Similar tape 29 is placed between the sheath 22 and a portion of the tape 25 passing under the sheath to hermetically seal the tube 20 between the vacuum bag 19 and the tool 11.

The liner 23 is extended beyond the end of sheath 22 and fits directly against a relatively large area of the breather pad 17, thereby forming direct communication therebetween.

The vacuum valve or connector 21 comprises an elongate body 31 having a longitudinal passage 32 therein closed at one end by a sealing screw 33. The body 31 has opposite flat surfaces 34 perforated by a number of small orifices 35. It is tapered at 36 at its end nearest the orifices 35 and also along its sides at 39 to facilitate its insertion into the flattened breather tube 20.

As seen in FIG. 3 and 4, the sheath 22 of the breather tube 20 extends outwardly beyond the ends of the liner 23 and inner sleeve 24, and is hermetically sealed to the body 31 by an adhesive sealing tape 41 surrounding the latter.

The end of body 31 adjacent the screw 33 is slidably received in a socket formed in a tubular holder 40 secured by bolts 141 to a frame part 42 forming part of a frame (not shown) which also supports the tool 11. A set screw 43 is threaded in the side of the holder 40 to removably secure the connector 21 in place.

A vacuum pipe 44 is threaded into the body 31 to communicate with the passage 32 and extends through a longitudinal slot 45 in the holder 40. The pipe 44 is connected through a quick release coupling 46 (FIG. 1) of conventional construction to a vacuum hose 47 leading to a suitable vacuum pump or other vacuum source (not shown).

Accordingly, when a vacuum is applied to the connector 21 and air, resin, and other substances are drawn from the part 14 during the curing process, these effluents will be sucked through the breather pad 17 and overlying portion of liner 23 and thence along the length of liner 23 wherein the resin will be filtered out and thus prevented from passing through the connector 21 to the vacuum source. The vacuum applied to the vacuum bag along with pressure applied concurrently to the exterior of the bag will insure intimate contact between the pad 17 and the overlying portion of liner 23 to permit direct fluid communication therebetween.

Obviously, the tube 20 may be made of any length desired to insure proper filtering and retention of the effluent resin from the treated part.

It will be apparent that the vacuum bag 19 and vacuum tube 20 can be quickly and readily removed by stripping them from the tool 11 while disconnecting the coupling 46 and removing the vacuum connector 21 from its holder 40, thus reducing the time required for each successive curing operation.

The apparatus may also be used to cure a thermosetting adhesive layer during the bonding of two superposed layers or sections of metal or of metal and a composite material. For example, as shown in FIG. 7, the part being treated can comprise superposed sections 50 and 51 with a layer 52 of a suitable thermosetting adhesive therebetween. Such a part can be used in lieu of part 14 in FIG. 2 during evacuation of the bag 19 in a curing operation such as described above wherein air, moisture and volatiles would be drawn from the adhesive layer 52 around its outer edge 53.

From the foregoing it will be seen that I have provided a highly effective and reliable, yet inexpensive, means for removing resins and other effluents given off by resinous material being cured while preventing the hardened material from clogging the vacuum lines, valves, pumps, etc., in the evacuating system. Accordingly, the device of this invention permits a large number of curing operations to be made without damage to the evacuating system.

I claim:

1. Apparatus for use in the forming of a part of thermosetting resinous material or metallic and thermosetting adhesive material or a combination thereof in which said part is mounted in uncured state on a forming tool and under a flexible porous pad with the pad and part covered by a flexible bag of an air-impervious material sealed to said tool therearound, which comprises:

- a tube of air-impervious material connectable at one end to a vacuum source and hermetically insertable into said flexible bag at its other end,
- a porous liner in said tube, said liner extending beyond said other end and being in contact with said pad whereby to provide vacuum connection between said one end of said tube and said part through said liner and said pad.

2. Apparatus as defined in claim 1 wherein said tube and said liner are both flexible.

3. Apparatus as defined in claim 2 wherein said liner comprises intertwined flexible fibers.

4. Apparatus as defined in claim 3 wherein said fibers are nylon fibers.

5. Apparatus as defined in claim 1 including a vacuum connector adapted for insertion into said one end of said tube and into said liner, said vacuum connector having a passage therein and at least one orifice leading from said passage to the exterior of the vacuum connector for communication with said liner, and means for interconnecting said passage with a vacuum source.

6. Apparatus as defined in claim 5 wherein said at least one orifice is a plurality of orifices.

7. Apparatus as defined in claim 6 including a receptacle for removably supporting said connector.

8. Apparatus as defined in claim 6 wherein said tube extends in collapsed configuration along its length.

9. Apparatus as defined in claim 8 including a cloth sleeve fitted within said liner.

10. Apparatus as defined in claim 9 wherein said cloth sleeve is formed from fiberglass cloth.

11. Apparatus as defined in claim 6 wherein said vacuum connector has opposite sides through which said plurality of orifices extend, and in which at least parts of said sides converge toward one end of said vacuum connector to facilitate the insertion of said vacuum connector into said one end of said tube.

12. Apparatus as defined in claim 11 wherein parts of said sides converge toward oppositely positioned edges of said vacuum connector.

* * * * *